C. KNUDSEN.
MACHINE FOR CUTTING SLICES OF MEAT OR THE LIKE.
APPLICATION FILED MAY 8, 1915.

1,152,029.

Patented Aug. 31, 1915.

Inventor
Christian Knudsen
by W. H. Babcock
Attorney

UNITED STATES PATENT OFFICE.

CHRISTIAN KNUDSEN, OF COPENHAGEN, DENMARK.

MACHINE FOR CUTTING SLICES OF MEAT OR THE LIKE.

1,152,029.  Specification of Letters Patent.  Patented Aug. 31, 1915.

Application filed May 8, 1915. Serial No. 26,896.

*To all whom it may concern:*

Be it known that I, CHRISTIAN KNUDSEN, engineer, a subject of the King of Denmark, residing at Copenhagen, in the Island of See-land and Kingdom of Denmark, have invented certain new and useful Improvements in Machines for Cutting Slices of Meat or the like; and I do hereby declare the following to be a full, clear, and exact description of the invention, such as will enable others skilled in the art to which it appertains to make and use the same.

This invention relates to a machine for cutting slices of meat, sausage, cheese or the like for sandwiches. The different sorts of meat, etc., are distributed around the center of the machine in vertical guides, and the knife, preferably in the form of a rotary circular disk is placed at the end of an arm which moves the knife along under all the guides, cutting slices from all those pieces of meat which during the action of the machine have come into contact with the knife, said knife preferably being moved by planet-wheel gear. The movement of the meat, etc., is intermittent and generally caused by a pawl and ratchet mechanism.

Another part of the invention consists in the combination of the cutting machine with a balance. In some cases the balance will be used to put the pawl-mechanism out of action after the desired weight of meat has been cut off.

Figure 1:
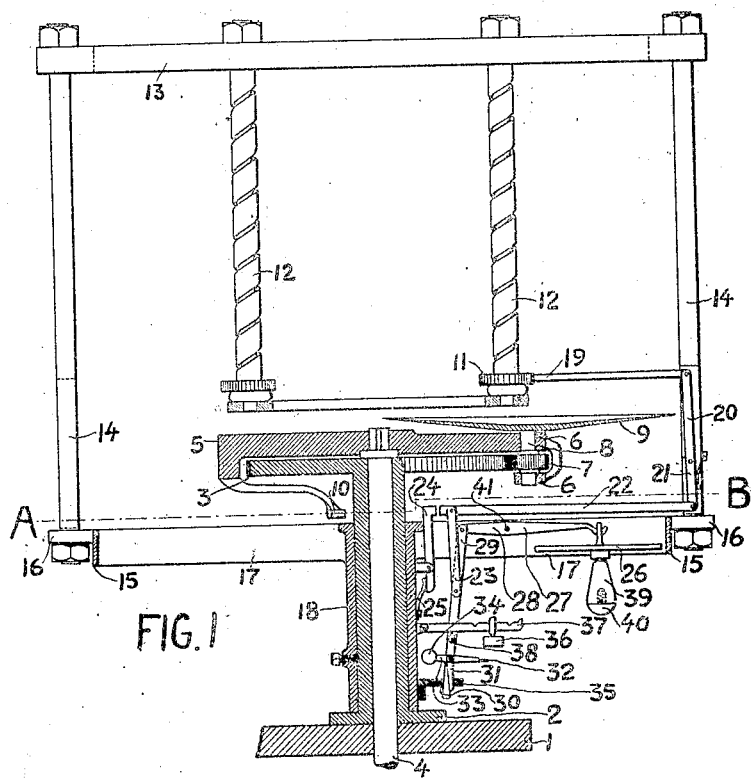
Figure 2:
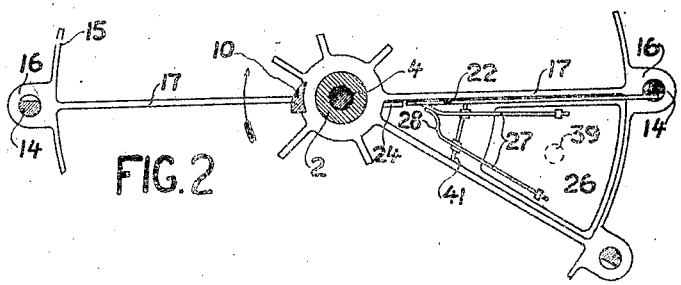

The accompanying drawing shows schematically a form of the invention and therein shows Figure 1 a vertical section, Fig. 2 a horizontal section according to the line A—B, Fig. 1.

On a fast base 1, for example a table, or the like, is arranged a frame work 2 which on its upper end bears a fast cogged wheel 3. The frame 2 forms the upper bearing for the crank shaft 4 which is rotated in the direction of the arrow in Fig. 2. With the shaft 4, there is rigidly connected an arm or disk 5 which on one of its ends bears the (preferably double) bearing 6 of an axle 8 of the movable planet wheel 7 which rotates the knife 9 by gearing with the cogged wheel
3. The arm or disk 5 bears a catch 10, the sectional form of which is shown in Fig. 2, and which serves to put into operation the pawl and ratchet mechanism for the movement of the meat which mechanism consists of a ratchet wheel 11 which at intervals moves one of the transporting spindles 12. The mechanisms intended to move these spindles and the meat and to regulate the thickness of the meat slices form no parts of this invention and are therefore not described and fully shown in the drawing. Only the principal parts of the frame work, which are intended to bear the mechanism for the transport of the meat, are shown.
The frame work consists of an upper ring 13 which is connected by stays 14 with a ring 15 which has a number of perforated lugs 16 receiving the lower ends of the stays 14. The ring 15 is connected by radial arms 17 with a hub 18, which is fastened to the frame 2.

The movement of the ratchet wheel is effected by a rod 19 which forms the principal part of the transporting mechanism for the meat, the pawl being arranged to take one or several teeth of the ratchet wheel in a similar manner as is used in shaping machines or other machine-tools.

The rod 19 may be actuated by any convenient mechanism. In the drawing there is for this purpose a lever, one arm 20 of which is connected with the rod 19, while the other arm 21 is linked to a rail 22 which at its opposite end is joined to the mechanism of the balance by links 23. In its working position the free end of the rail 22 will be situated at the same height as the lever 24 which is loaded by a spring 25 and under each rotation of the shaft 4 will be once pushed out of its position in a radial direction by the catch 10.

The scale 26 of the balance is suspended in two points on the forked end 27 of the scale beam 27, 28 which turns around a pin or the like 41. At the free end of the inner arm 28 a supporting rod 29 is provided which is guided by a hole 30 of a guiding angle 35. In the hole 30 is also guided a pin 31 which forms the lowest of the three arms 31, 32, 33 of a three-armed lever which is counterbalanced by a counter-poise 34 and thus will have a tendency to turn around its turning pin. If then the pin 31 leaves the hole 30, the lever will turn and the pin 31 furthermore not allow the lever to penetrate into the hole, because its end is lying against the upper surface of the guiding angle 35. These movements are effected by the balance. If the desired quantity of meat has fallen down upon the scale, this will move into its position of equilibrium, and the supporting rod 29 will move upward in the hole 30, and the pin 31 leaves said hole. Although the lever 24 be pushed aside by the catch 10, it will not be able to reach the end of the rail 22, as this is placed too high. Rail 22 will only be able to return into the working position, if firstly the meat is taken away from the scale and secondly the pin 31 is again guided into the hole 30 by hand.

The quantity of the meat to be cut off can be varied by changing the position of the weight 36 on the arm 37 which rests on knife edge bearing 38, while the weight of the scale 26 is adjusted by the additional weight 39 with the adjusting piece 40.

The machine works as follows: The piece of meat or the like to be cut in slices is put into connection with its transport devices and the shaft 4 put into rotation. The arm or disk 5 will take part in the rotation and the wheel 7 will turn the knife 9 around its own axis and at the same time around the axis of the shaft 4. The knife will cut slices from the pieces of meat the transporting devices of which are in activity. The slices will fall upon the scale 26, and if the desired quantity has fallen, the scale will move downward and the rod 29, links 23 and rail or pitman 22 ascend and come out of the way of the lever 24. At the same time the lever 31, 32, 33 will have stopped the parts just described at their highest position, so as to stop the movement of the rod 19 also and the ratchet wheel 11 until a fresh quantity of the same sort of meat or the like is needed and the arm 31 anew guided into the hole 30 and thus the weighing and transporting mechanism anew put into motion.

What I claim is:

1. In a meat slicer, a knife, means for feeding the meat toward the knife, a scale pan positioned to receive the slices as they are cut, and connections between the scale pan and feeding means whereby the amount of material in the pan controls the feeding of the meat to the knife.

2. In meat slicers, a shaft, a knife, intervening mechanism for driving said knife and means for feeding the meat to said knife, said means comprising a pitman, in combination with a scale receiving the meat as sliced and connections between said scale and said pitman moving the end of the latter into inoperative position on the movement of said scale into equilibrium.

3. In meat slicers, a driven knife and means for feeding the meat to the knife, said means comprising a pitman, in combination with a scale receiving the sliced meat and means governed by said scale to disconnect the feeding mechanism by moving the pitman to inoperative position.

4. In a meat slicer, a knife and planetary gearing for driving said knife, in combination with means for feeding the meat, said means comprising a pitman, a catch traveling with said knife and a lever interposed between said catch and pitman to be engaged by the former to engage the latter.

5. In a meat slicer, a stationary gear, a shaft, a catch carried by said shaft, bearings carried by said shaft, a stub-shaft mounted in said bearings and a gear mounted on said stub-shaft and traveling around and meshing with the stationary gear, in combination with a plurality of meat guides arranged above the path of said knife, a scale arranged under each guide to receive the sliced meat, individual feeding mechanism for each guide comprising a pitman, and connections between said scale and pitman for moving the latter to an inoperative position when a predetermined amount of any particular kind of meat has been sliced.

6. In a meat slicer, a stationary gear, a shaft, a catch carried by said shaft, bearings carried by said shaft, a stub-shaft mounted in said bearings and carrying the knife and a gear mounted on said stub-shaft and traveling around and meshing with the stationary gear, in combination with a plurality of meat guides arranged above the path of said knife, a scale arranged under each guide to receive the sliced meat, individual feeding mechanism for each guide intermittently actuated by said catch and comprising a pitman, connections between said scale and pitman for moving the latter to an inoperative position when a predetermined amount of meat has been sliced, and means for automatically locking said pitman in such inoperative position.

In testimony whereof, I have signed my name to this specification in the presence of two subscribing witnesses.

CHRISTIAN KNUDSEN.

Witnesses:
 FREDERIK BARTHOLIN HOLM,
 C. L. MENGELBERG.